United States Patent
Ueno et al.

(10) Patent No.: US 10,424,816 B2
(45) Date of Patent: Sep. 24, 2019

(54) LITHIUM-ION SECONDARY BATTERY AND MANUFACTURING METHOD THEREOF

(71) Applicant: TOYOTA JIDOSHA KABUSHIKI KAISHA, Toyota-shi, Aichi-ken (JP)

(72) Inventors: Yukiyoshi Ueno, Toyota (JP); Tomoyuki Mizuno, Toyota (JP); Kunimitsu Yamamoto, Toyota (JP); Junko Ohira, Toyota (JP); Kaoru Inoue, Hirakata (JP); Hideaki Fujita, Kyotanabe (JP); Hideki Sano, Ikeda (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/039,261

(22) PCT Filed: Nov. 27, 2014

(86) PCT No.: PCT/IB2014/002577
§ 371 (c)(1),
(2) Date: May 25, 2016

(87) PCT Pub. No.: WO2015/079308
PCT Pub. Date: Jun. 4, 2015

(65) Prior Publication Data
US 2017/0162912 A1    Jun. 8, 2017

(30) Foreign Application Priority Data
Nov. 27, 2013  (JP) ................................. 2013-245116

(51) Int. Cl.
*H01M 10/04* (2006.01)
*H01M 10/058* (2010.01)
(Continued)

(52) U.S. Cl.
CPC ....... *H01M 10/0587* (2013.01); *H01M 2/345* (2013.01); *H01M 4/133* (2013.01);
(Continued)

(58) Field of Classification Search
None
See application file for complete search history.

(56) References Cited

U.S. PATENT DOCUMENTS

| 6,599,659 B1 | 7/2003 | Endo et al. | |
| 2013/0247364 A1* | 9/2013 | Fukatsu | H01M 10/0404 29/623.2 |
| 2013/0337305 A1* | 12/2013 | Nagai | H01M 4/505 429/94 |

FOREIGN PATENT DOCUMENTS

| JP | 2001-273881 A | 10/2001 |
| JP | 2002063938 A | 2/2002 |

(Continued)

OTHER PUBLICATIONS

English translation of JP2010287513 (2010).*
English translation of JP2012119183 (2012).*

*Primary Examiner* — Yoshitoshi Takeuchi
(74) *Attorney, Agent, or Firm* — Sughrue Mion, PLLC (57) ABSTRACT

A lithium-ion secondary battery (100) includes a wound electrode body (80), a nonaqueous electrolyte, and a box-shaped case (50). The wound electrode body includes a positive electrode (10), a negative electrode (20), and a separator (40). The box-shaped case contains the wound electrode body and the nonaqueous electrolyte. The wound electrode body includes a starting-end-side negative electrode remainder portion (22) provided in a winding-direction starting end portion (81) of the wound electrode body. The winding-direction starting end portion exists at a winding center side. The starting-end-side negative electrode remainder portion protrudes toward the winding center side along (Continued)

a winding direction beyond the positive electrode. A surplus nonaqueous electrolyte exists in a gap between the wound electrode body and the box-shaped case. The starting-end-side negative electrode remainder portion is positioned in a region where the surplus nonaqueous electrolyte exists, when the lithium-ion secondary battery is disposed in a predetermined posture.

6 Claims, 6 Drawing Sheets

(51) Int. Cl.

| | | |
|---|---|---|
| *H01M 10/0587* | (2010.01) | |
| *H01M 10/02* | (2006.01) | |
| *H01M 4/70* | (2006.01) | |
| *H01M 2/34* | (2006.01) | |
| *H01M 10/0525* | (2010.01) | |
| *H01M 10/0567* | (2010.01) | |
| *H01M 10/42* | (2006.01) | |
| *H01M 4/133* | (2010.01) | |
| *H01M 4/1393* | (2010.01) | |
| *H01M 4/505* | (2010.01) | |
| *H01M 4/525* | (2010.01) | |
| *H01M 4/587* | (2010.01) | |
| *H01M 4/62* | (2006.01) | |
| *H01M 4/66* | (2006.01) | |
| *H01M 4/02* | (2006.01) | |

(52) U.S. Cl.
CPC ......... *H01M 4/1393* (2013.01); *H01M 4/505* (2013.01); *H01M 4/525* (2013.01); *H01M 4/587* (2013.01); *H01M 4/622* (2013.01); *H01M 4/623* (2013.01); *H01M 4/625* (2013.01); *H01M 4/661* (2013.01); *H01M 4/70* (2013.01); *H01M 10/0431* (2013.01); *H01M 10/0525* (2013.01); *H01M 10/0567* (2013.01); *H01M 10/4235* (2013.01); *H01M 2004/021* (2013.01); *Y02T 10/7011* (2013.01)

(56) References Cited

FOREIGN PATENT DOCUMENTS

| | | | | |
|---|---|---|---|---|
| JP | 2005-327550 A | | 11/2005 | |
| JP | 2007-335165 A | | 12/2007 | |
| JP | 2010-287513 A | | 12/2010 | |
| JP | 2010287513 | * | 12/2010 | ............ H01M 10/04 |
| JP | 2012-119183 A | | 6/2012 | |
| JP | 2012119183 | * | 6/2012 | ........ H01M 10/0567 |
| JP | 2013-171669 A | | 9/2013 | |
| JP | 2013-206579 A | | 10/2013 | |
| JP | 2013-229181 A | | 11/2013 | |
| KR | 10-2013-0108132 A | | 10/2013 | |
| WO | WO 2012/117557 | * | 9/2012 | .......... H01M 10/052 |
| WO | 2013/108396 A1 | | 7/2013 | |

\* cited by examiner

LITHIUM-ION SECONDARY BATTERY AND MANUFACTURING METHOD THEREOF

BACKGROUND OF THE INVENTION

1. Field of the Invention

The invention relates to a lithium-ion secondary battery and manufacturing method thereof.

2. Description of Related Art

A nonaqueous electrolyte secondary battery such as a lithium-ion secondary battery is used as a so-called portable power supply for a personal computer, a portable device or the like, or as a power supply for driving a motor vehicle. In particular, a lithium-ion secondary battery, which is small in size and light in weight and which is capable of obtaining a high energy density, is desirably used as a power supply for driving a hybrid vehicle, an electric vehicle, or the like.

In one typical form of the lithium-ion secondary battery, a flat wound electrode body and a nonaqueous electrolyte are provided inside a rectangular box-shaped case corresponding in shape to the wound electrode body. By employing this form, it is possible to increase the capacity of individual batteries and to efficiently dispose a plurality of batteries in a limited space. Thus, this form is desirably employed in an application where an especially high energy density is required (e.g., a power supply for driving a motor vehicle).

This high-energy-density battery is usually used in such a state that a voltage is controlled to fall within a predetermined range (e.g., 3.0 V to 4.2 V). However, if currents which are above normal are supplied due to an erroneous operation and so forth, the battery may be overcharged to a voltage exceeding a predetermined voltage. When such an overcharge occurs, a gas may be generated due to decomposition of a nonaqueous electrolyte or the internal temperature of the battery may be increased due to heat generated from an active material. As a technology for addressing this problem, PCT International Publication No. WO 2013/108396 discloses a lithium-ion secondary battery which includes a nonaqueous electrolyte containing a compound (typically, an aromatic compound) (hereinafter referred to as a "gas generating agent") lower in oxidative decomposition potential than a nonaqueous solvent and includes a current interrupt device (CID) for forcedly interrupting a charging current if an internal pressure of a case becomes equal to or greater than a predetermined value due to decomposition of the gas generating agent. If the battery becomes overcharged, the gas generating agent is oxidized and decomposed on a surface of a positive electrode, at which time a hydrogen gas ($H_2$) is generated from a negative electrode. The internal pressure of the battery is rapidly increased by the gas thus generated. This makes it possible to operate the current interrupt device at an early stage. Thus, it is possible to realize a battery which is high in reliability (overcharge resistance).

In the lithium-ion secondary batteries disclosed in PCT International Publication No. WO 2013/108396, if the potential of the positive electrode becomes extremely high, for example, if the potential of the positive electrode locally exceeds the elution potential of a metal element (typically, a transition metal element) which makes up a positive electrode active material, the metal element may be eluted from the positive electrode active material and may be precipitated on the surfaces of the separator and the negative electrode which are opposite to the positive electrode active material. According to the findings of the inventors, micro short-circuits may be resultantly generated inside the battery and a self-discharge amount (a leak current) may grow larger.

SUMMARY OF THE INVENTION

The present invention provides a lithium-ion secondary battery capable of preventing the potential of a positive electrode from locally becoming too high and capable of more reliably suppressing the elution of a metal element from a positive electrode active material, and a manufacturing method thereof.

As a result of the repeated in-depth research conducted by the inventors, it was found that the elution of the metal element from the positive electrode active material is easily generated in a "specific portion", namely in a winding-direction end portion of a wound electrode body (particularly, a winding-direction starting end portion positioned at a winding center). Accordingly, the inventors focused on suppressing the elution of the metal element in the winding-direction end portion.

A lithium-ion secondary battery according to a first aspect of the present invention includes a wound electrode body, a nonaqueous electrolyte and a box-shaped case. The wound electrode body includes an elongated positive electrode, an elongated negative electrode longer than the positive electrode, and a separator. The wound electrode body is wound in a longitudinal direction and has a flat shape. The positive electrode and the negative electrode are laminated with the separator interposed between the positive electrode and the negative electrode. The box-shaped case contains the wound electrode body and the nonaqueous electrolyte. The wound electrode body includes a starting-end-side negative electrode remainder portion provided in a winding-direction starting end portion of the wound electrode body. The winding-direction starting end portion exists at a winding center side. The starting-end-side negative electrode remainder portion protrudes toward the winding center side along a winding direction beyond the positive electrode. A surplus nonaqueous electrolyte exists in a gap between the wound electrode body and the box-shaped case. The starting-end-side negative electrode remainder portion is positioned in a region where the surplus nonaqueous electrolyte exists, when the lithium-ion secondary battery is disposed in a predetermined posture.

In a wound electrode body of an ordinary lithium-ion secondary battery, with a view to suppressing the precipitation of lithium in the negative electrode, the negative electrode is made longer than the positive electrode in the winding-direction starting end portion of the wound electrode body. The negative electrode protrudes toward a winding center side along a winding direction. In other words, in the winding-direction starting end portion positioned at the winding center side, the negative electrode includes a portion (hereinafter simply referred to as a "remainder portion") which is not opposite to the positive electrode and a portion (hereinafter simply referred to as a "opposite portion") which adjoins the remainder portion and which is opposite to the positive electrode. In the negative electrode of this configuration, lithium ions occluded due to charging are gradually diffused from the opposite portion toward the remainder portion. According to the research conducted by the inventors, if air exists inside the box-shaped case at this time, the lithium ions diffused into the remainder portion react with oxygen contained in the air and become lithium oxides. If the lithium ions of the remainder portion are consumed in this way, additional lithium ions are diffused from the opposite portion toward the remainder portion. If this phenomenon continues to occur, lithium ions are deficient in the opposite portion. Therefore, lithium ions may be excessively moved from the starting end portion of the positive electrode which faces the opposite portion. Consequently, the potential of the starting end portion of the positive electrode may be increased and the elution of metal elements from a positive electrode active material may be locally accelerated in the starting end portion of the positive electrode.

In the battery disclosed herein, the remainder portion of the negative electrode is positioned in the nonaqueous electrolyte (namely, vertically lower than the liquid level of the nonaqueous electrolyte). Consequently, even if oxygen exists inside the box-shaped case, it is possible to isolate the remainder portion of the negative electrode from the oxygen. As a result, hardly no lithium oxides are generated in the remainder portion of the negative electrode. This makes it possible to suppress the diffusion of lithium ions from the opposite portion toward the remainder portion. In other words, with this configuration, it is possible to prevent the potential of the starting end portion of the positive electrode facing the opposite portion from being locally increased. This makes it possible to accurately control the elution of metal elements (typically, transition metal elements, e.g., nickel (Ni), cobalt (Co) and manganese (Mn)) from the positive electrode active material.

The internal structure of the battery (specifically, the positional relationship between the winding-direction starting end portion of the positive electrode and the liquid level of the surplus nonaqueous electrolyte) can be clarified by conducting a measurement through nondestructive inspection such as X-ray CT (X-ray Computed Tomography) in a use temperature zone of the battery (typically, in a normal temperature zone, e.g., under an environment of 25° C.).

In the lithium-ion secondary battery according to the first aspect of the present invention, the wound electrode body may include a terminating-end-side negative electrode remainder portion provided in a winding-direction terminating end portion existing at a winding outer periphery side. The terminating-end-side negative electrode remainder portion protrudes toward the winding outer periphery side along the winding direction beyond the positive electrode. The terminating-end-side negative electrode remainder portion may be positioned in the region where the surplus nonaqueous electrolyte exists. In a typical configuration of the wound electrode body, a negative electrode remainder portion may exist in the winding-direction terminating end portion (the end portion existing at the winding outer periphery side) as well as the winding-direction starting end portion. In this configuration, just like the starting end portion, the potential may be locally increased in the winding-direction terminating end portion of the positive electrode. By allowing both the winding-direction starting end portion and the winding-direction terminating end portion of the negative electrode to exist in the nonaqueous electrolyte, it is possible to further suppress the local potential increase in the end portion of the positive electrode. This makes it possible to further suppress the elution of metal elements from the positive electrode active material. Accordingly, it is possible to provide the effects of the present invention at a higher level.

In the lithium-ion secondary battery according to the first aspect of the present invention, the wound electrode body may include two winding flat portions opposite to each other and two semicircular winding round portions existing between the two winding flat portions in the winding direction. One of the two winding round portions may be positioned in a bottom of the box-shaped case when the lithium-ion secondary battery is disposed in a predetermined posture. The winding-direction starting end portion of the wound electrode body may include a winding-direction starting end portion of the positive electrode. The winding-direction starting end portion of the positive electrode and a liquid level of the surplus nonaqueous electrolyte may be positioned in the winding flat portions. In general, the winding round portions are larger in curvature than the winding flat portions. Therefore, the winding round portions are susceptible to a stress attributable to expansion and contraction of an active material layer associated with charging and discharging. Particularly, since the starting end portion of the positive electrode existing at the winding center side has a small radius of curvature, a crack may be generated in the positive electrode active material layer or the positive electrode active material layer may be peeled off and dropped. By disposing the starting end portion of the positive electrode in one of the winding flat portions, it is possible to prevent the aforementioned problem and to stably realize superior battery characteristics. In addition, by suppressing the height of the liquid level of the surplus nonaqueous electrolyte as low as possible, i.e., to the winding flat portions, it is possible to reduce costs.

In the lithium-ion secondary battery according to the first aspect of the present invention, the starting-end-side negative electrode remainder portion may be positioned in one of the winding flat portions. In other words, the starting-end-side negative electrode remainder portion may be positioned in the region of one of the winding flat portions interposed between the liquid level of the nonaqueous electrolyte and the lower winding round portion (hereinafter often referred to as a "lower round portion"). This makes it possible to provide the effects of the present invention at an even higher level.

The term "bottom" used herein refers to the vertical lower side of the box-shaped case when the battery is disposed at a predetermined posture (a normal posture). Typically, the term "bottom" refers to the surface opposite to the lid of the box-shaped case. Accordingly, the "bottom" available, e.g., when the battery temporarily comes into an irregular state due to the overturn of a box-shaped battery or other causes or when upper and lower parts of the battery are wrongly assembled, is not included in the bottom referred to herein.

In the lithium-ion secondary battery according to the first aspect of the present invention, a tip of the winding-direction starting end portion of the positive electrode may be oriented vertically downward when the lithium-ion secondary battery is disposed in the predetermined posture. With this configuration, it is possible to accurately cut off the supply of oxygen to the remainder portion of the negative electrode and to realize a battery having stable quality.

The term "the winding-direction starting end portion of the positive electrode" used herein refers to a region including a winding-direction tip of the positive electrode which is positioned at the most winding center side. For example, the term "the winding-direction starting end portion of the positive electrode" refers to a region which includes the winding-direction tip of the positive electrode and which extends several mm (e.g., about 5 mm from the winding-direction tip of the positive electrode) in the winding direction.

The lithium-ion secondary battery according to the first aspect of the present invention may further include a current interrupt device and a gas generating agent. The current interrupt device is configured to operate when the internal pressure of the box-shaped case rises. The gas generating agent is decomposed if the battery comes into an overcharged state. As set forth above, in the battery including the gas generating agent, for example, when the battery is stored with the SOC (State of charge) kept high or when charging and discharging are repeated under a high-temperature environment (e.g., 50° C. to 70° C.), the gas generating agent (typically, an aromatic compound) is gradually oxidized and decomposed. Thus, a polymer (polymer film) derived from the gas generating agent may be formed on the surface of the positive electrode. Consequently, the structure of the positive electrode active material becomes instable (for example, the valence of a manganese element is changed from $Mn^{2+}$ to $Mn^{3+}$), as a result of which an elution potential of metal elements from the positive electrode may be reduced. In the case of using, e.g., an aromatic gas generating agent, the aromatic compound acts like a catalyst and a reaction activity of the positive electrode active material becomes high. Thus, metal elements may be eluted with ease. Accordingly, the application of the technology disclosed herein is particularly effective in batteries including an additive (typically, an aromatic compound, e.g., a gas generating agent) which is easily oxidized and decomposed on the surface of the positive electrode to form a polymer on the surface of the positive electrode.

A second aspect of the present invention is directed to a manufacturing method of a lithium-ion secondary battery which includes a wound electrode body, a nonaqueous electrolyte and a box-shaped case. As will be described later, the wound electrode body includes an elongated positive electrode, an elongated negative electrode longer than the positive electrode, and a separator. The manufacturing method according to the second aspect of the present invention includes: fabricating a flat wound electrode body by laminating the positive electrode and the negative electrode with the separator interposed between the positive electrode and the negative electrode and by winding the positive electrode, the negative electrode, and the separator in a longitudinal direction; providing a starting-end-side negative electrode remainder portion in a winding-direction starting end portion of the wound electrode body, the winding-direction starting end portion existing at a winding center side, and the starting-end-side negative electrode remainder portion protruding toward the winding center side along a winding direction beyond the positive electrode; providing the wound electrode body inside the box-shaped case; pouring the nonaqueous electrolyte into the box-shaped case which contains the wound electrode body; setting a pouring amount of the nonaqueous electrolyte to an amount at which, when the nonaqueous electrolyte is impregnated into the wound electrode body, a surplus nonaqueous electrolyte exists in a gap between the wound electrode body and the box-shaped case and the starting-end-side negative electrode remainder portion is positioned vertically lower than a liquid level of the surplus nonaqueous electrolyte; and performing an initial charging treatment between the positive electrode and the negative electrode in a state where the starting-end-side negative electrode remainder portion is positioned vertically lower than the liquid level of the surplus nonaqueous electrolyte.

According to the research conducted by the inventors, it was found that the elution of metal elements from the positive electrode active material may be conspicuously generated during the initial charging treatment (e.g., aging after initial charging). By performing the initial charging treatment in a state where the starting-end-side negative electrode remainder portion is disposed in the nonaqueous electrolyte, it is possible to effectively suppress the elution of metal elements from the positive electrode active material. Therefore, according to the production method mentioned above, it is possible to efficiently and stably produce a lithium-ion secondary battery having a reduced self-discharge amount.

The manufacturing method according to the second aspect of the present invention may include forming the wound electrode body by wounding the positive electrode, the negative electrode and the separator to position a winding-direction starting end portion of the positive electrode in one of two winding flat portions of the wound electrode body, the winding-direction starting end portion of the positive electrode constituting the winding-direction starting end portion of the wound electrode body, and the two winding flat portions being opposite to each other. Furthermore, the wound electrode body may be provided inside the box-shaped case such that one of two semicircular winding round portions of the wound electrode body is positioned in a bottom of the box-shaped case when the lithium-ion secondary battery is disposed in a predetermined posture. The two semicircular winding round portions may exists between the two winding flat portions in the winding direction. Furthermore, the pouring amount of the nonaqueous electrolyte may be set to an amount at which, when the nonaqueous electrolyte is impregnated into the wound electrode body, the liquid level of the surplus nonaqueous electrolyte is positioned at the winding flat portions. By disposing the winding-direction starting end portion of the positive electrode in one of the winding flat portions, it is possible to stably realize a wound electrode body superior in mechanical strength. This is desirable in terms of a reduction in defective products (defective product ratio) in the production process. In addition, by disposing one of the winding round portions in the vertical bottom of the box-shaped case and adjusting the pouring amount of the nonaqueous electrolyte such that the level of the nonaqueous electrolyte is positioned at the winding flat portions, it is possible to suitably produce a battery superior in long-term durability and reliability.

In the lithium-ion secondary battery mentioned above, the elution of metal elements from the positive electrode active material remains small, for example, even if the battery is maintained at a high temperature. It is therefore possible to reduce a self-discharge amount (leak current). Taking advantage of these characteristics, the battery can be desirably used in, e.g., an application which covers a wide temperature zone or an application which requires a high energy density. Examples of these applications include a power source (driving power supply) for a motor mounted to a motor vehicle such as a plug-in hybrid vehicle (PHV) or the like. Accordingly, another aspect of the present invention provides a motor vehicle provided with one of the lithium-ion secondary batteries (which may be an assembled battery) disclosed herein.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Preferred embodiments of the present invention will now be described with reference to the accompanying drawings. In the drawings described below, members or parts performing the same actions will be designated by like reference signs. There may be a case where duplicate description is omitted or simplified. The dimensional relationship (length, width, thickness, etc.) in the respective drawings does not necessarily reflect an actual dimensional relationship. Matters necessary for carrying out the present invention other than those specifically referred to in the subject specification may be grasped as design matters of a person of ordinary skill based on the related art in this field. The present invention may be carried out on the basis of the content disclosed herein and the common technical knowledge in this field.

Figure 1:
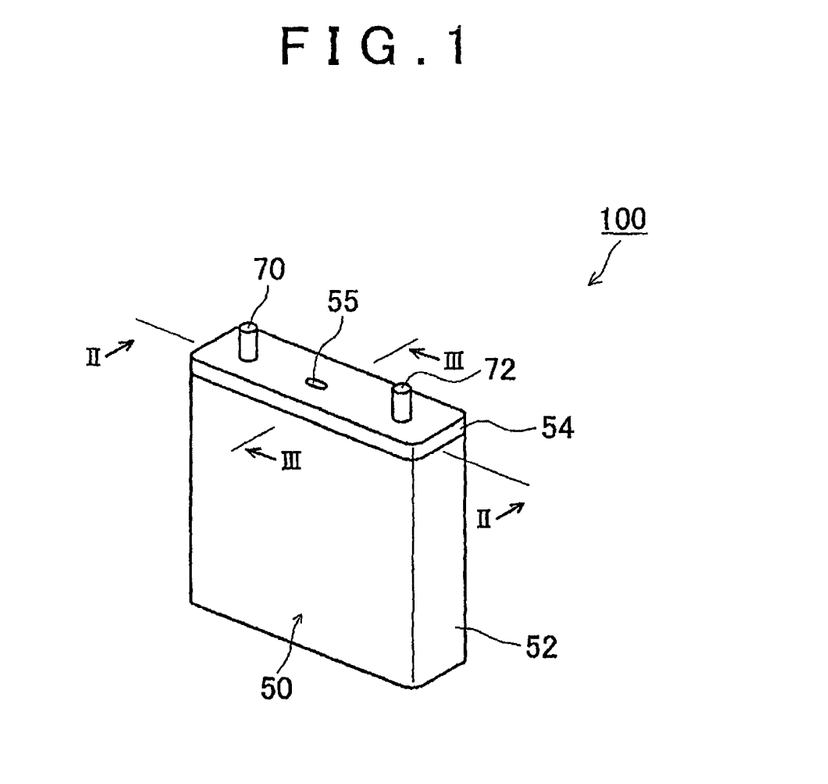
FIG. 1 is a perspective view schematically illustrating the external form of a lithium-ion secondary battery according to one embodiment of the present invention.
Figure 2:
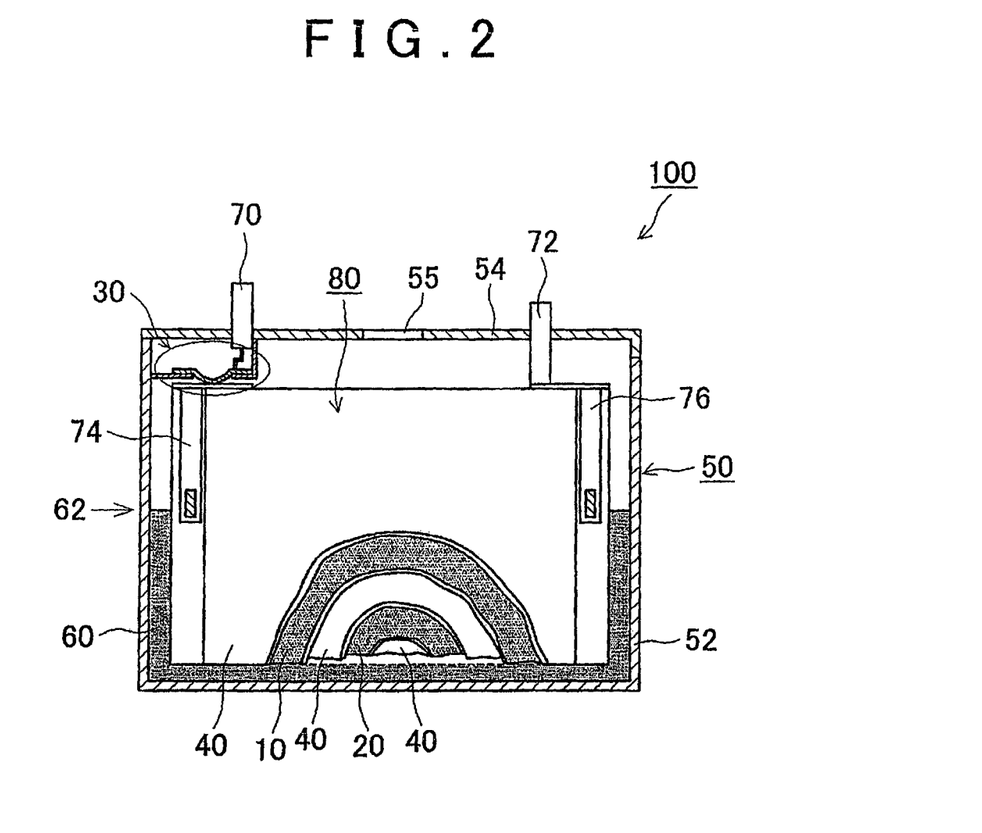
FIG. 2 is a schematic diagram showing a vertical cross-sectional structure taken along line II-II in FIG. 1.
Figure 3:
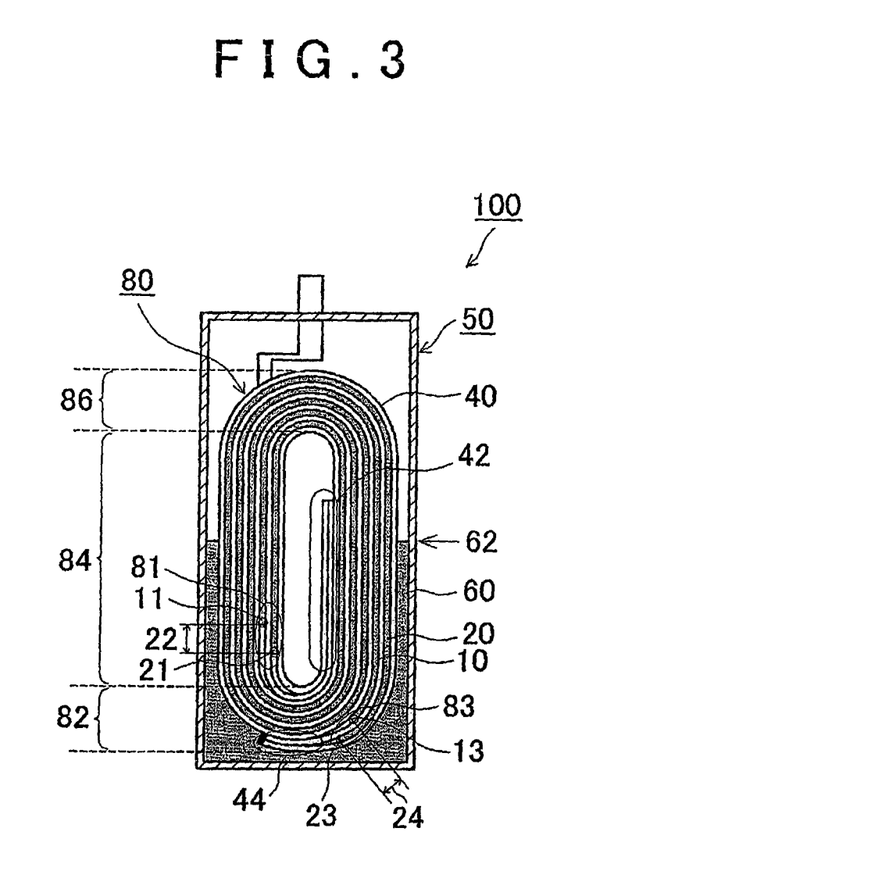
FIG. 3 is a schematic diagram showing a vertical cross-sectional structure taken along line III-III in FIG. 1.

The present invention will now be described by taking, as an example, a lithium-ion secondary battery according to one embodiment of the present invention, but is not particularly limited thereto. The schematic configuration of the lithium-ion secondary battery according to one embodiment of the present invention is shown in FIGS. 1 to 3. FIG. 1 is a perspective view schematically illustrating an external form of a lithium-ion secondary battery 100. FIG. 2 is a schematic diagram showing a vertical cross-sectional structure taken along line II-II in FIG. 1. FIG. 3 is a schematic diagram showing a vertical cross-sectional structure taken along line III-III in FIG. 1.

As shown in FIGS. 1 and 2, the lithium-ion secondary battery 100 has a configuration in which a flat wound electrode body 80 and a surplus nonaqueous electrolyte 60 are provided inside a box-shaped case 50. The box-shaped case 50 includes a flat rectangular parallelepiped (box-shaped) case body 52 which has a top end opening and a lid 54 which closes the opening of the case body 52. Metallic material such as aluminum or steer is preferably used as the material of which the box-shaped case 50 is made. An external-connection-purpose positive electrode terminal 70 is located on the top surface of the box-shaped case 50 (namely, the lid 54), and is electrically connected to a positive electrode 10 of the wound electrode body 80 and a negative electrode terminal 72 electrically connected to a negative electrode 20 of the wound electrode body 80. A safety valve 55 is provided in the lid 54 and is used to discharge a gas generated inside the box-shaped case 50 to the outside of the box-shaped case 50.

As shown in FIG. 2, a current interrupt device 30 operated by the increase in the internal pressure of the box-shaped case 50 is installed in the box-shaped case 50. The current interrupt device 30 is configured to, when the internal pressure of the box-shaped case 50 rises, interrupt a charging current by cutting off a conductive path extending from at least one of the electrode terminals (namely, the positive electrode terminal 70 and/or the negative electrode terminal 72) to the wound electrode body 80. In the present embodiment, the current interrupt device 30 is installed between the positive electrode terminal 70 fixed to the lid 54 and the wound electrode body 80 and is configured to, when the internal pressure of the box-shaped case 50 rises, cut off an electrically-conductive path extending from the positive electrode terminal 70 to the wound electrode body 80.

The flat wound electrode body 80 and the surplus non-aqueous electrolyte 60 are provided in the box-shaped case 50. From the viewpoints of safety, cost and work efficiency, the internal space of the box-shaped case 50 is typically filled with dry air. In other words, for example, oxygen comparable to the atmosphere may be included in the internal space of the box-shaped case 50. The flat wound electrode body 80 includes an elongated sheet-like positive electrode (positive electrode sheet) 10 and an elongated sheet-like negative electrode (negative electrode sheet) 20. The positive electrode sheet 10 includes an elongated positive electrode current collector and a positive electrode active material layer formed on at least one surface (typically, both surfaces) of the positive electrode current collector to extend in the longitudinal direction thereof. The negative electrode sheet 20 includes an elongated negative electrode current collector and a negative electrode active material layer formed on at least one surface (typically, both surfaces) of the negative electrode current collector to extend in the longitudinal direction thereof. Two separators 40 as insulation layers for preventing the positive electrode active material layer and the negative electrode active material layer from directly contacting each other are disposed between the positive electrode active material layer and the negative electrode active material layer.

A wound core portion obtained by overlapping and densely laminating the positive electrode active material layer formed on the surface of the positive electrode current collector and the negative electrode active material layer formed on the surface of the negative electrode current collector is formed in the central region of the wound electrode body 80 in a width direction which is defined as a direction extending from one end portion to the other end portion in a winding-axis-direction of the wound electrode body 80. Further, in the winding-axis-direction opposite end portions of the wound electrode body 80, a positive electrode active material layer-free portion of the positive electrode sheet 10 and a negative electrode active material layer-free portion of the negative electrode sheet 20 protrude outward from the wound core portion, respectively. A positive electrode current collecting plate 74 is attached to the positive-electrode-side protrusion portion (namely, the positive electrode active material layer-free portion). A negative electrode current collecting plate 76 is attached to the negative-electrode-side protrusion portion (namely, the negative electrode active material layer-free portion). The positive electrode current collecting plate 74 and the negative electrode current collecting plate 76 are electrically connected to the positive electrode terminal 70 and the negative electrode terminal 72, respectively.

As shown in FIG. 3, the wound electrode body 80 includes a starting-end-side negative electrode remainder portion 22 provided in a winding-direction starting end portion 81 existing at a winding center side, the starting-end-side negative electrode remainder portion 22 protruding toward the winding center side along a winding direction beyond the positive electrode 10. Thus, even if winding misalignment occurs when winding an electrode body, it is possible to prevent the positive electrode 10 from protruding toward the winding center side beyond the negative electrode 20. This makes it possible to properly suppress the precipitation of lithium in the negative electrode 20. The length (winding-direction length) of the starting-end-side negative electrode remainder portion 22 may be, e.g., about several cm to several tens of cm. For example, in the example shown in FIG. 3, the length of the starting-end-side negative electrode remainder portion 22 is approximately 4 cm (40 mm). As in the case of the starting end portion 81 mentioned above, the wound electrode body 80 includes a terminating-end-side negative electrode remainder portion 24 provided in a winding-direction terminating end portion 83 typically existing at a winding outer periphery side, the terminating-end-side negative electrode remainder portion 24 protruding toward the winding outer periphery side along the winding direction beyond the positive electrode 10. The length (winding-direction length) of the terminating-end-side negative electrode remainder portion 24 may be, e.g., about several cm to several tens of cm. In the example shown in FIG. 3, the length of the terminating-end-side negative electrode remainder portion 24 is approximately 1 cm (10 mm).

Typically, the separators 40 have an elongated sheet-like shape and extend longer than the negative electrode 20 in the winding direction. In the example shown in FIG. 3, two separators 40 are used in one lithium-ion secondary battery 100. One of the separators 40 is interposed between a starting end portion 21 of the negative electrode 20 and a starting end portion 11 of the positive electrode 10 while including a remainder portion 42, equivalent to about 0.5 turn, provided in the winding-direction starting end portion 81 existing at the winding center side of the wound electrode body 80. The other separator 40 includes a remainder portion 42, equivalent to about 1.5 turn, provided in the winding-direction starting end portion 81 existing at the winding center side of the wound electrode body 80. The other separator 40 is interposed at the outer circumferential side of the starting end portion 11 of the positive electrode 10. In addition, the two separators 40 include remainder portions 44 provided in the winding-direction terminating end portion 83 existing at the winding outer periphery side of the wound electrode body 80, the remainder portions 44 protruding toward the winding outer periphery side along the winding direction beyond the negative electrode 20. The length (winding-direction length) of the remainder portions 44 of the separators 40 in the terminating end portion 83 may be, e.g., about several cm to several tens of cm. In the example shown in FIG. 3, the length of the remainder portions 44 of the separators 40 is approximately 10 cm. Further, a winding-fixing tape is bonded to the remainder portions 44 of the separators 40 so as to prevent unwinding of the wound electrode body 80, thereby maintaining the shape of the wound electrode body 80.

On the cross section orthogonal to the winding axis, the wound electrode body 80 includes two winding flat portions 84 opposite to each other and two semicircular winding round portions 82 and 86 interposed between the winding flat portions 84. In the present embodiment, one of the winding round portions 82 and 86 (a lower round portion 82) is disposed at the bottom in the vertical direction of the box-shaped case 50. The other winding round portion (an upper round portion 86) is disposed at the side of the lid 54 (at the ceiling side) in the vertical direction of the box-shaped case 50. In one preferred example, the winding-direction starting end portion 11 of the positive electrode 10 is disposed in one of the winding flat portions 84. If the winding-direction starting end portion 11 of the positive electrode 10 is disposed in one of the winding round portions 82 and 86 having a large curvature, the positive electrode active material layer is expanded and contacted during charge and discharge and is susceptible to a high stress. Thus, the positive electrode active material layer tends to be peeled off with ease. By employing the aforementioned configuration, it is possible to appropriately prevent this problem. In another preferred example, the winding-direction starting end portion 21 of the negative electrode 20 is disposed in one of the winding flat portions 84. Particularly, it is preferred that the entirety of the starting-end-side negative electrode remainder portion 22 is disposed in one of the winding flat portions 84. In other words, it is preferred that the entirety of the winding-direction starting end portion 81 of the wound electrode body 80 is disposed in one of the winding flat portions 84. This makes it possible to reliably prevent occurrence of crack or slip in an active material layer existing near the winding center. The term "the winding-direction starting end portion of the negative electrode" used herein refers to a region including the winding-direction tip of the negative electrode which is positioned at the most winding center side. For example, the term "the winding-direction starting end portion of the negative electrode" refers to a region including not only the winding-direction tip of the negative electrode but also the starting-end-side negative electrode remainder portion 22 and the opposite portion. The starting-end-side negative electrode remainder portion 22 extends from the tip in the winding direction. The opposite portion adjoins the starting-end-side negative electrode remainder portion 22 and is opposite to the winding-direction starting end portion 11 of the positive electrode 10.

In the lithium-ion secondary battery 100 disclosed herein, the wound electrode body 80 is impregnated with a non-aqueous electrolyte. Furthermore, a surplus nonaqueous electrolyte 60 exists in a gap between the wound electrode body 80 and the box-shaped case 50. When the battery is disposed at a predetermined position and in a predetermined posture, the starting-end-side negative electrode remainder portion 22 is positioned in a region where the surplus nonaqueous electrolyte 60 exists. In other words, the starting-end-side negative electrode remainder portion 22 is positioned vertically lower than the liquid level 62 of the surplus nonaqueous electrolyte 60. By employing this configuration, it is possible to prevent the potential of the starting end portion of the positive electrode from locally becoming too high and to suppress the elution of metal elements from the positive electrode active material.

In one preferred example, not only the starting-end-side negative electrode remainder portion 22 but also the starting end portion. 11 of the positive electrode 10 is positioned in the region where the surplus nonaqueous electrolyte 60, exists. In other words, the starting end portion 11 of the positive electrode 10 is positioned vertically lower than the liquid level 62 of the surplus nonaqueous electrolyte 60. For example, if the battery is inclined or if a nonaqueous solvent component is vaporized due to the increase in the internal temperature of the battery, the height of the liquid level 62 of the surplus nonaqueous electrolyte 60 may be slightly changed. By disposing the starting-end-side negative electrode remainder portion 22 and the starting end portion 11 of the positive electrode 10 in the region where the surplus nonaqueous electrolyte 60 exists, it is possible to reliably isolate the starting-end-side negative electrode remainder portion 22 from oxygen and to cut off an oxygen source. This makes it possible to suppress generation of a lithium oxide in the starting-end-side negative electrode remainder portion 22 and to accurately prevent the potential of the starting end portion 11 of the positive electrode 10 from being locally increased.

In one preferred example, when the battery is disposed at a predetermined position and in a predetermined posture, the tip of the winding-direction starting end portion 11 of the positive electrode 10 is oriented vertically downward. According to this example, the winding-direction starting end portion 81 of the wound electrode body 80 (typically, the starting-end-side negative electrode remainder portion 22, e.g., the starting end portion 11 of the positive electrode 10 and the starting end portion 21 of the negative electrode 20) can be reliably disposed in the region where the surplus nonaqueous electrolyte 60 exists.

Figure 4:
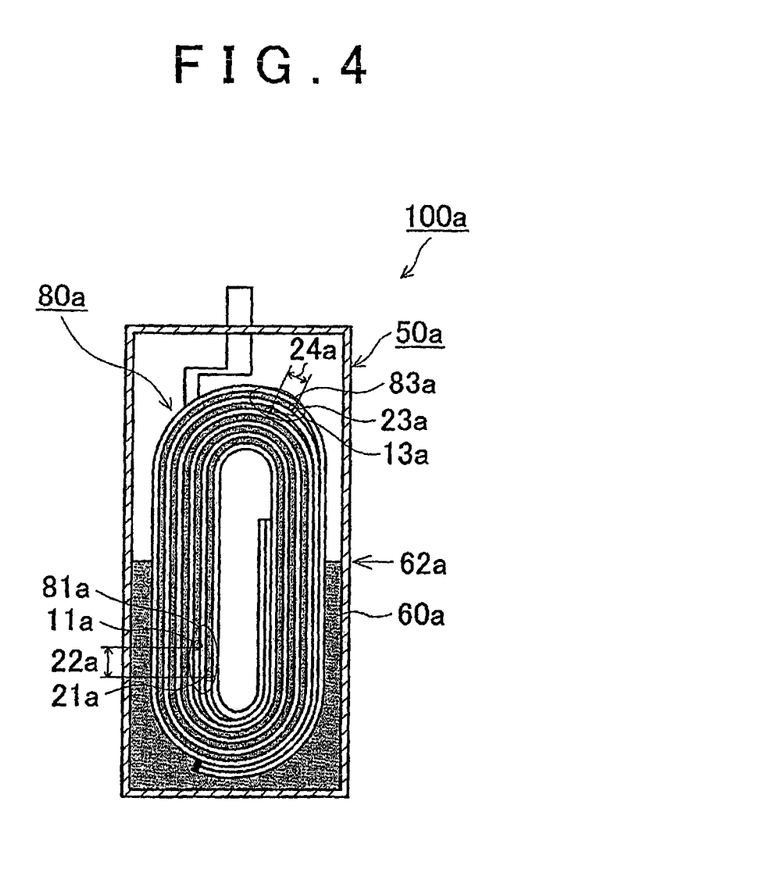
FIG. 4 is a schematic diagram showing a vertical cross-sectional structure of a lithium-ion secondary battery according to another embodiment of the present invention.

In the technology disclosed herein, as shown in FIGS. 3 and 4, the starting-end-side negative electrode remainder portion 22 is disposed in the region where the surplus nonaqueous electrolyte 60 exists. On the other hand, the terminating-end-side negative electrode remainder portion 24 may be disposed in the region where the surplus nonaqueous electrolyte 60 exists or a region where the surplus nonaqueous electrolyte 60 does not exist. For example, in the example shown in FIG. 3, the terminating-end-side negative electrode remainder portion 24 existing at the winding outer periphery side of the wound electrode body 80 is disposed in the region where the surplus nonaqueous electrolyte 60 exists. In other words, the starting-end-side negative electrode remainder portion 22 and the terminating-end-side negative electrode remainder portion 24 are all disposed vertically lower than the liquid level 62 of the surplus nonaqueous electrolyte 60. With this configuration, it is possible to prevent the potential of the positive electrode from being locally increased in the starting end portion and the terminating end portion. This makes it possible to provide the effects of the present invention at a higher level. Referring to FIG. 4, a lithium-ion secondary battery 100a according to another embodiment includes a box-shaped case 50a and a wound electrode body 80a. A starting end portion 81a of the wound electrode body 80a existing at the winding center side (typically, a starting-end-side negative electrode remainder portion 22a, e.g., a winding-direction starting end portion 11a of a positive electrode and a winding-direction starting end portion 21a of a negative electrode) is disposed in a region where a surplus nonaqueous electrolyte 60a exists. In other words, the starting end portion 81a of the wound electrode body 80a is disposed vertically lower than a liquid level 62a of the surplus nonaqueous electrolyte 60a. On the other hand, a winding-direction terminating end portion 83a of the wound electrode body 80a existing at the winding outer periphery side (typically, a terminating-end-side negative electrode remainder portion 24a, e.g., a winding-direction terminating end portion 13a of the positive electrode and a winding-direction terminating end portion 23a of the negative electrode) is disposed in a region where a surplus nonaqueous electrolyte 60a does not exist. This configuration can be desirably employed, particularly in the case where the area of the negative electrode remainder portion is narrow (or nearly zero) in the winding-direction terminating end portion 83a of the wound electrode body 80a.

In one preferred example, as shown in FIG. 3, the terminating-end-side negative electrode remainder portion 24 existing at the winding outer periphery side of the wound electrode body 80 is disposed in the region where the surplus nonaqueous electrolyte 60 exists. For example, the winding-direction terminating end portion 13 of the positive electrode 10 and the winding-direction terminating end portion 23 of the negative electrode 20 are all disposed vertically lower than the liquid level 62 of the surplus nonaqueous electrolyte 60. This makes it possible to provide the effects of the present invention at a higher level.

In a conventional ordinary lithium-ion secondary battery, from the viewpoint of low cost, almost all of a poured nonaqueous electrolyte is impregnated into a wound electrode body. In other words, the surplus nonaqueous electrolyte does not exist in a gap between the wound electrode body and the box-shaped case, or a small amount of the surplus nonaqueous electrolyte can be observed when the case is tilted. In contrast, the lithium-ion secondary battery 100 disclosed herein is configured to provide the surplus nonaqueous electrolyte 60 with a view to obtaining the aforementioned advantages (namely, the advantages of suppressing the local increase of the positive electrode potential and suppressing the elution of metal elements from the positive electrode active material).

In another preferred example, the liquid level 62 of the surplus nonaqueous electrolyte 60 is positioned in the winding flat portions 84. As described above, the winding-direction starting end portion 11 of the positive electrode 10 is preferably disposed in one of the winding flat portions 84. Thus, it is preferred that the liquid level 62 of the surplus nonaqueous electrolyte 60 is higher than one of the round portions (the lower round portion) 82 of the wound electrode body 80. From the viewpoint of low cost, it is preferred that the liquid level 62 of the surplus nonaqueous electrolyte 60 is lower than the other round portion (the upper round portion) 86 of the wound electrode body 80. In one preferred example, the liquid level 62 of the surplus nonaqueous electrolyte 60 may be set at about ¼ to ¾ of the height of the box-shaped case 50. In the example shown in FIG. 3, the liquid level 62 of the surplus nonaqueous electrolyte 60 is disposed at about ½ of the height of the box-shaped case 50.

The materials and the members of the lithium-ion secondary battery 100 are not particularly limited and may be the same as those of a conventional well-known lithium-ion secondary battery. For example, a case made of lightweight metal such as aluminum may be suitably used as the box-shaped case 50. In one preferred example, the current interrupt device (CID) 30 operated when the internal pressure of the box-shaped case 50 rises is installed in the box-shaped case 50. This makes it possible to realize a high capacity battery superior in reliability (overcharge resistance).

As the positive electrode 10 of the wound electrode body 80, it is possible to suitably use a type of the positive electrode in which a positive electrode active material layer is formed on a positive electrode current collector by attaching a composition containing a positive electrode active material, a binder, a conductive material and so forth to the surface of the positive electrode current collector. As the positive electrode active material, it is possible to suitably use lithium composite metal oxides having a layered structure or a spinel structure (e.g., $LiNiO_2$, $LiCoO_2$, $LiFeO_2$, $LiMn_2O_4$, $LiNi_{0.33}Co_{0.33}Mn_{0.33}O_2$, $LiNi_{0.5}Mn_{1.5}O_4$, $LiCrMnO_4$ or $LiFePO_4$) and so forth. As the binder, it is possible to suitably use a polymer material such as polyvinylidene fluoride (PVdF) or polyethylene oxide (PEO). As the conductive material, it is possible to suitably use a carbon material such as carbon black (e.g., acetylene black and Ketjen black) or the like. As the positive electrode current collector, it is possible to suitably use a conductive member made of a metal superior in conductivity (e.g., aluminum).

As the negative electrode 20 of the wound electrode body 80, it is possible to suitably use a type of the negative electrode in which a negative electrode active material layer is formed on a negative electrode current collector by attaching a composition, containing a negative electrode active material, a binder, a thickener and so forth to the surface of the negative electrode current collector. As the negative electrode active material, it is possible to use a carbon material such as graphite, hard graphitizable carbon (hard carbon), easily graphitizable carbon (soft carbon) or the like. Among them, it is possible to suitably use graphite. As the binder, it is possible to suitably use polymer materials such as polytetrafluoroethylene (PTFE) and the like, or rubbers such as styrene-butadiene rubber (SBR) and the like. As the thickener, it is possible to suitably use cellulose such as carboxymethyl cellulose (CMC) or the like. As the negative electrode current collector, it is possible to suitably use a conductive member made of metal superior in conductivity (e.g., copper). A capacity ratio of the positive and negative electrodes, namely a capacity ratio ($C_N/C_P$) calculated as a ratio of an initial charging capacity ($C_N$) of the negative electrode to an initial charging capacity ($C_P$) of the positive electrode, may be set at, e.g., 1.0 to 2.1. This makes it possible to realize a high energy density and a superior cycle characteristic.

As the separators 40 of the wound electrode body 80, it is possible to suitably use a porous resin sheet made of a resin such as polyethylene (PE), polypropylene (PP) or the like. It is preferred that a porous heat-resistant layer containing inorganic fillers such as alumina (aluminum oxide: $Al_2O_3$), silica (silicon oxide: $SiO_2$) or the like is provided on one surface or both surfaces of the porous resin sheet. According to this configuration, even if the internal temperature of the battery is increased (to, e.g., 150° C. or higher, typically, 200° C. or higher) due to a certain cause, it is possible to suitably maintain the insulation state of the positive and negative electrodes. Further, even when lithium is precipitated on the surface of the negative electrode due to repeated charging and discharging, it is possible to suppress generation of a micro short circuit in the relevant region and to reduce a self-discharge amount.

As the nonaqueous electrolyte, it is possible to suitably use a nonaqueous electrolyte obtained by having a supporting salt included in a nonaqueous solvent. As the nonaqueous solvent, it is possible to use an aprotic solvent such as carbonates, esters, ethers, nitriles, sulfones, or lactones or the like. Among them, it is possible to suitably use carbonates such as ethylene carbonate (EC), diethyl carbonate (DEC), dimethyl carbonate (DMC), ethyl methyl carbonate (EMC) and the like. As the supporting salt, it is possible to suitably use a lithium salt such as $LiPF_6$, $LiBF_4$ or the like. The nonaqueous electrolyte may contain various kinds of additives in addition to the nonaqueous solvent and the supporting salt. Examples of the additives include a gas generating agent such as cyclohexyl benzene (CHB), biphenyl (BP) or the like and a film forming agent such as vinylene carbonate (VC), vinyl ethylene carbonate (VEC), fluoroethylene carbonate (FEC), lithium bis (oxalato) borate ($Li[B(C_2O_4)_2]$) or the like.

The lithium-ion secondary battery 100 shown in FIGS. 1 to 3 can be manufactured by, e.g., the following steps of: fabricating a flat wound electrode body 80 by laminating an elongated positive electrode 10 and an elongated negative electrode 20 longer than the positive electrode 10 with separators 40 interposed therebetween and by winding them in a longitudinal direction; providing the wound electrode body 80 inside a box-shaped case 50; pouring a nonaqueous electrolyte into the box-shaped case 50; and performing an initial charging treatment between the positive electrode 10 and the negative electrode 20. The respective steps will now be described one after another.

In the manufacturing method disclosed herein, the elongated positive electrode 10, the negative electrode 20 longer than the positive electrode 10, and the separators 40 as insulation layers are prepared first. As the positive electrode 10, the negative electrode 20 and the separators 40, it is possible to use the aforementioned elements. Then, a wound electrode body 80 is fabricated by laminating the separator 40, the negative electrode 20, the separator 40 and the positive electrode 10 in the named order and winding them in a longitudinal direction. At this time, in the winding-direction starting end portion of the wound electrode body 80, the starting end portion 21 of the negative electrode 20 is adjusted to protrude toward a winding center side along a winding direction beyond the starting end portion 11 of the positive electrode 10, thereby providing a starting-end-side negative electrode remainder portion 22. For example, two separators 40 are previously wound around a winding core to some extent (typically, about 0.5 to 2 turn). The negative electrode 20 is inserted between the two separators 40 and is wound to some extent (typically, several cm to several tens of cm), thereby forming the starting-end-side negative electrode remainder portion 22 as shown in FIG. 3. Then, the positive electrode 10 is inserted between the two separators 40 and is wound such that the positive electrode 10 and the negative electrode 20 are insulated from each other. As a method of forming the wound electrode body 80 into a flat shape, the positive electrode 10, the negative electrode 20 and the separators 40 may be wound into a flat shape using, e.g., a winding core whose cross section in a direction perpendicular to a winding axis has a flat shape. Alternatively, a cylindrical wound electrode body may be fabricated using a winding core whose cross section in a direction perpendicular to a winding axis has a substantially circular shape. Thereafter, the cylindrical wound electrode body may be formed into a flat shape by pressing the cylindrical wound electrode body laterally. In this way, the wound electrode body 80 having a flat shape can be fabricated.

In one preferred example, the winding or the pressing are performed such that the winding-direction starting end portion 11 of the positive electrode 10 is disposed in one of the winding flat portions of the flat wound electrode body 80. In a more preferred example, the winding or the pressing are performed such that the winding-direction starting end portion 11 of the positive electrode 10 and the winding-direction starting end portion 21 of the negative electrode 20 are disposed in one of the winding flat portions of the flat wound electrode body 80. In other words, the winding or the pressing are performed such that the starting-end-side negative electrode remainder portion 22 is disposed in one of the winding flat portions of the flat wound electrode body 80. This makes it possible to properly prevent rupture of an active material layer (e.g., a positive electrode active material layer) and to reduce a defective product ratio in the manufacturing process. In addition, even if an active material layer (typically, a positive electrode active material layer) is repeatedly expanded and contracted during charge and discharge, it is possible to realize superior durability.

In the manufacturing method disclosed herein, the wound electrode body 80 is then provided inside a box-shaped case 50. As the box-shaped case 50, it is possible to use a case made of the aforementioned material. Typically, the wound electrode body 80 is provided inside a case body 52. Thereafter, a lid 54 is capped on the opening of the case body 52, thereby sealing the case body 52. The sealing process in which the case body 52 is sealed with the lid 54 may be performed in the same manner as in the manufacturing method of a conventional lithium-ion secondary battery. When the wound electrode body 80 is provided inside the box-shaped case 50, the orientation of the wound electrode body 80 is set such that, as shown in FIGS. 1 to 3, one of the two winding round portions (the lower round portion) of the wound electrode body 80 is positioned in the vertical bottom region of the box-shaped case 50. Thus, the winding-direction starting end portion 81 of the wound electrode body 80 can be accurately disposed in the region where the surplus nonaqueous electrolyte 60 exists. Alternatively, one of the two winding flat portions 84 of the wound electrode body 80 may be positioned in the vertical bottom region of the box-shaped case 50. The tip of the winding-direction starting end portion 11 of the positive electrode. 10 is positioned to face vertically downward. Thus, the winding-direction starting end portion 81 of the wound electrode body 80 (in other words, the starting end portion 11 of the positive electrode 10 and the starting end portion 21 of the negative electrode 20) can be accurately disposed in the region where the surplus nonaqueous electrolyte 60 exists.

In the manufacturing method disclosed herein, the non-aqueous electrolyte is then poured (disposed) into the box-shaped case 50. Typically, the nonaqueous electrolyte is poured (disposed) from a pouring port formed in the lid 54. Thereafter, the pouring port is hermetically sealed. As the nonaqueous electrolyte, it is possible to use the aforementioned nonaqueous electrolyte. The pouring amount of the nonaqueous electrolyte may be set such that the nonaqueous electrolyte is impregnated into the wound electrode body 80 and the surplus nonaqueous electrolyte 60 exists in a gap between the wound electrode body 80 and the box-shaped case 50 and such that the starting-end-side negative electrode remainder portion 22 is positioned vertically lower than the liquid level 62 of the surplus nonaqueous electrolyte 60. In this way, it is possible to build (assemble) the lithium-ion secondary battery 100 shown in FIGS. 1 to 3.

In one preferred example, a gas generating agent is contained in the nonaqueous electrolyte. Thus, in a battery provided with a current interrupt device, it is possible to operate the current interrupt device at an early stage when the battery is overcharged. This makes it possible to realize a battery superior in reliability (overcharge resistance).

In the battery in which one of the two winding round portions (the lower round portion) of the wound electrode body is positioned in the vertical bottom region of the box-shaped case 50 (see FIGS. 1 to 3) when the wound electrode body is provided therein, the pouring amount of the nonaqueous electrolyte may be adjusted such that the liquid level 62 of the surplus nonaqueous electrolyte 60 is positioned in the winding flat portions 84.

The mounting of the wound electrode body 80 and the pouring of the nonaqueous electrolyte are typically performed under a dry air atmosphere using a dry bench, a dry room, or the like. Therefore, it is possible to significantly improve the productivity and the work efficiency, as compared with a case where a mounting work and a pouring work are performed under an inert gas (e.g., a nitrogen gas) atmosphere using, e.g., a glove box or the like. This is also desirable from the viewpoint of cost. In general, if a large amount of oxygen is contained inside the box-shaped case 50, the precipitation of metal from the positive electrode active material may occur in, e.g., the starting-end-side negative electrode remainder portion 22 of the wound electrode body 80. However, according to the technology disclosed herein, it is possible to appropriately control the metal deposition. Thus, the productivity and the battery performance (typically, the reduction of a self-discharge amount) can be made compatible at a higher level.

In the manufacturing method disclosed herein, an initial charge treatment is then performed between the positive electrode 10 and the negative electrode 20. Typically, an external power supply is connected between the positive electrode 10 (the positive electrode terminal 70) and the negative electrode 20 (the negative electrode terminal 72). Charging (typically, constant current charging) is performed to a predetermined voltage. Thereafter, the battery is kept (aged or left) within a high temperature range for a predetermined time period. By doing so, it is possible to form a film derived from the nonaqueous electrolyte on the surface of the negative electrode and to realize a battery superior in cycle, characteristic. The charging voltage across the positive and negative electrodes may be set to fall within a voltage range which is available, e.g., when the SOC is in a range of 65% to 110%. For example, in a battery which is fully charged at 4.2 V, the voltage across the positive and negative electrodes may be set to fall within a range of about 3.8 V to 4.3 V. Further, the temperature during aging may be set at about 40° C. or higher (typically 50° C. or higher, preferably 60° C. or higher, e.g., 60±10° C.). Further, the period (time) for which the battery is kept in a high temperature zone may be set at, e.g., 5 to 48 hours, preferably 10 to 24 hours.

In the manufacturing method disclosed herein, the initial charging treatment is performed in such a state that the starting-end-side negative electrode remainder portion 22 is positioned vertically lower than the liquid level 62 of the surplus nonaqueous electrolyte 60. Thus, it is possible to prevent the potential of the winding-direction starting end portion 11 of the positive electrode 10 from locally becoming high and to effectively suppress the elution of metal from the positive electrode active material. Accordingly, it is possible to highly suppress generation of a micro short circuit and to stably produce a highly reliable lithium-ion secondary battery. This is also desirable from the viewpoints of the improvement of a defective product ratio in a manufacturing process and the reduction of cost.

The nonaqueous secondary battery (typically, the lithium-ion secondary battery) disclosed herein can be used in various kinds of applications and is characterized in that the battery performance (e.g., the energy density) is high and the reliability is superior. For example, the nonaqueous secondary battery is low in self-discharge amount and high in initial battery capacity and can realize high durability even when charging and discharging are repeated. Further, the nonaqueous secondary battery can accurately operate the current interrupt device when the battery is overcharged and can have both the durability (overcharge resistance) and the battery characteristic (high energy density). Therefore, taking advantage of these properties, the nonaqueous secondary battery can be desirably applied to a large battery that requires high output and high capacity characteristics. More specifically, the nonaqueous secondary battery can be desirably applied to, e.g., a large-capacity-type lithium-ion secondary battery which has a theoretical capacity of 10 Ah or higher (e.g., 10 Ah to 250 Ah), e.g., 50 Ah or higher, furthermore 100 Ah or higher (e.g., 100 Ah to 200 Ah) and which is assumed to be used in a charge-discharge cycle including high-rate discharge of 5 C or higher (e.g., 5 C to 50 C), e.g., 10 C or higher (e.g., 10 C to 40 C). The lithium-ion secondary battery of this configuration (which may be an assembled battery) can be suitably used as, e.g., a power source (driving-purpose power supply) for a motor mounted to a motor vehicle. The kind of motor vehicle is not particularly limited. Typically, examples of the motor vehicle include automobiles such as a plug-in hybrid vehicle (PHV), a hybrid vehicle (HV), an electric vehicle (EV) and the like.

Certain examples according to the present invention will now be described. However, the present invention is not limited to these examples.

<<Lithium-Ion Secondary Battery A>>

In this example, a lithium-ion secondary battery as schematically shown in FIG. 3 was built. More specifically, a slurry composition was first prepared by mixing Li[Ni$_{0.33}$Co$_{0.33}$Mn$_{0.33}$]O$_2$ powder (LNCM) as positive electrode active Material powder, acetylene black (AB) as a conductive material, and polyvinylidene fluoride (PVdF) as a binder with N-methylpyrrolidone (NMP) such that the mass ratio of LNCM, AB and PVdF becomes equal to 94:3:3. The composition was coated on both surfaces of an elongated aluminum foil (positive electrode current collector) having a thickness of about 15 μm in a strip shape at a width of 94 mm, and was then dried (at a drying temperature of 80° C. for one minute) to form positive electrode active material layers. The aluminum foil coated with the positive electrode active material layers was rolled by a roll press machine, thereby producing an elongated positive electrode (having a total thickness of 170 μm and a length of 4500 mm).

Then, a slurry composition was prepared by mixing carbon black powder (C) as a negative electrode active material, styrene-butadiene rubber (SBR) as a binder, and carboxymethyl cellulose (CMC) as a thickener with ion-exchanged water such that the mass ratio of C, SBR and CMC becomes equal to 98.3:1.0:0.7. The composition was coated on both surfaces of an elongated copper foil (negative electrode current collector) having a thickness of about 10 μm in a strip shape at a width of 100 mm, and was then dried (at a drying temperature of 120° C. for one minute) to form negative electrode active material layers. The copper foil coated with the negative electrode active material layers was rolled by a roll press machine, thereby producing an elongated negative electrode (having a total thickness of 150 μm and a length of 4550 mm) longer than the positive electrode.

A flat wound electrode body was produced by overlapping and winding the elongated positive electrode and the elongated negative electrode with separators interposed therebetween. When laminating the positive electrode and the negative electrode, the manufacturing conditions were adjusted such that a starting-end-side negative electrode remainder portion has a length of 40 mm in a winding-direction starting end portion of the wound electrode body. In other words, a terminating-end-side negative electrode remainder portion having a length of 10 mm (namely, (the longitudinal-direction length of the negative electrode)−(the longitudinal-direction length of the positive electrode)−(the length of the starting-end-side negative electrode remainder portion)=4550 mm−4500 mm−40 mm=10 mm) exists in a winding-direction terminating end portion of the wound electrode body. Further, the manufacturing conditions were adjusted such that a starting end portion of the positive electrode is positioned in one of the winding flat portions of the wound electrode body. The separators used are of the type in which a porous heat-resistant layer containing alumina (Al$_2$O$_3$) particles and an acryl resin as a binder is formed on one surface of a three-layer base material having a polyethylene (PE) layer and polypropylene (PP) layers laminated on both surfaces of the polyethylene (PE) layer. A positive electrode terminal was bonded by being welded to an end portion of the positive electrode current collector of the wound electrode body thus obtained. A negative electrode terminal was bonded by being welded to an end portion of the negative electrode current collector of the wound electrode body thus obtained.

The wound electrode body was provided inside a box-shaped case made of aluminum, and a nonaqueous electrolyte was injected into the box-shaped case. At this time, the pouring amount of the nonaqueous electrolyte is set such that the nonaqueous electrolyte is impregnated into the wound electrode body and such that a surplus nonaqueous electrolyte exists in a gap between the wound electrode body and the box-shaped case. The pouring amount of the non-aqueous electrolyte is adjusted at ½ of the height of the box-shaped case such that the starting-end-side negative electrode remainder portion is positioned vertically lower than the liquid level of the surplus nonaqueous electrolyte. The nonaqueous electrolyte used at this time was prepared by dissolving LiPF$_6$ as a supporting salt at a concentration of 1 mol/L in a mixed solvent which contains ethylene carbonate (EC), dimethyl carbonate (DMC) and ethyl methyl carbonate (EMC) at a volume ratio of EC:DMC:EMC=3:3:4 and by adding vinylene carbonate at a ratio of 0.75% by mass of the total amount of the nonaqueous electrolyte, cyclohexyl benzene at a ratio of 4% by mass of the total amount of the nonaqueous electrolyte, and biphenyl at a ratio of 1% by mass of the total amount of the nonaqueous electrolyte. Then, a lid was mounted to an opening of the box-shaped case and was bonded to the box-shaped case by welding, thereby building a lithium-ion secondary battery A (having a positive electrode/negative electrode capacity ratio ($C_N/C_P$) of 1.36 and a rated capacity of 25 Ah).

<<Lithium-Ion Secondary Battery B>>

Figure 5:
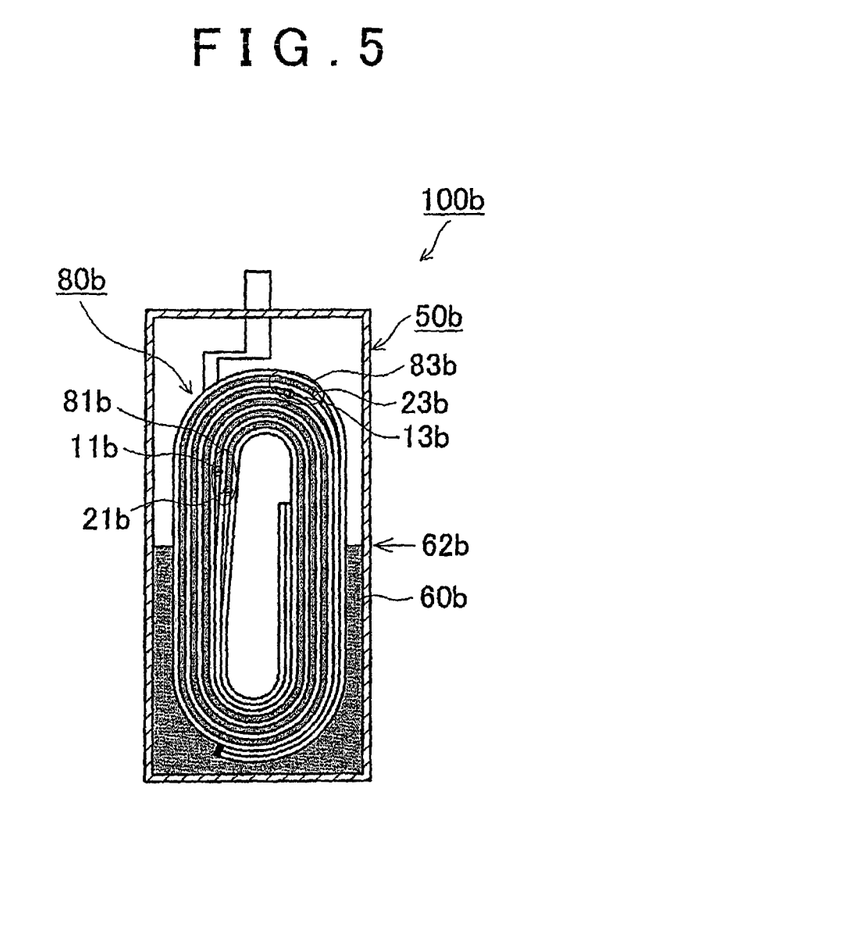
FIG. 5 is a schematic diagram showing a vertical cross-sectional structure of a lithium-ion secondary battery B (a comparative example)

In this example, a lithium-ion secondary battery as schematically shown in FIG. 5 was built. More specifically, just like the lithium-ion secondary battery A, a wound electrode body 80$b$ was provided inside a box-shaped case 50$b$. At this time, a winding-direction starting end portion 81$b$ of the wound electrode body 80$b$ (specifically, a starting end portion 11$b$ of a positive electrode and a starting end portion 21$b$ of a negative electrode) and a winding-direction terminating end portion 83$b$ of the wound electrode body 80$b$ (specifically, a terminating end portion 13$b$ of a positive electrode and a terminating end portion 23$b$ of a negative electrode) were all positioned higher than ½ of the height of the box-shaped case 50$b$. Then, a nonaqueous electrolyte was poured up to ½ of the height of the box-shaped case 50$b$. In other words, the nonaqueous electrolyte was disposed such that the starting end portion and the terminating end portion of the wound electrode body 80$b$ are not dipped into a surplus nonaqueous electrolyte 60$b$ (such that the two end portions of the wound electrode body 80$b$ is positioned vertically higher than the liquid level 62$b$ of the nonaqueous electrolyte). In this way, a lithium-ion secondary battery B (having a positive electrode/negative electrode capacity ratio ($C_N/C_P$) of 1.36 and a rated capacity of 25 Ah) was produced.

<<Initial Charging Treatment>>

Each of the lithium-ion secondary batteries A and B thus built was pinched With a jig and was pressed and confined such that a confining pressure becomes 400 kgf. Then, the lithium-ion secondary battery was subjected to constant current charging at a constant current of 20 A until the battery voltage reaches 3.95 V and was then subjected to constant voltage charging until the current becomes 0.1 A at the aforementioned voltage. Then, the lithium-ion secondary battery whose battery voltage is adjusted to 3.95 V was put into a temperature-controlled thermostatic oven and was heated to 66° C. The lithium-ion secondary battery was subjected to high-temperature aging until the elapsed time from the start of heating becomes 20 hours. The aged lithium-ion secondary battery was cooled to a normal temperature range and was then subjected to constant current discharging at a constant current of 60 A until the battery voltage reaches 3.0 V, whereby the SOC was made 0%.

<<Analysis of Eluted Metal Element>>

The lithium-ion secondary batteries A and B subjected to the initial charging treatment were disassembled. The negative electrode and the separators opposite to the starting end portion of the positive electrode were cut out. Then, the negative electrode and the separators thus cut were lightly cleaned twice to three times with a nonaqueous solvent (a mixed solvent containing EC, DMC and EMC at a volume ratio of 1:1:1) and were then punched into a size of 1 cm$^2$, thereby obtaining samples for ICP (Inductively Coupled Plasma) analysis. The samples for analysis were respectively heated and dissolved in an acid solvent (here, a sulfuric acid). The solution thus obtained was analyzed through ICP-AES (Atomic Emission Spectrometry) to quantify the content (μg) of metal elements. Then, the quantitative value thus obtained was divided by the area (cm$^2$) of the sample, thereby calculating an eluted metal amount per unit area (μg/cm$^2$). The results are shown in Table 1 and FIG. 6.

TABLE 1

| | | Eluted Metal Amount in Starting End Portion (μg/cm$^2$) | | | |
|---|---|---|---|---|---|
| Battery | Aging Temperature | Ni Elution Amount | Co Elution Amount | Mn Elution Amount | Total Elution Amount |
| B | 66° C. | 2.69 | 2.28 | 2.31 | 7.28 |
| A | 66° C. | <0.3 | <0.03 | <0.01 | <0.3 |
| A | 80° C. | <0.3 | <0.03 | <0.01 | <0.3 |

Figure 6:
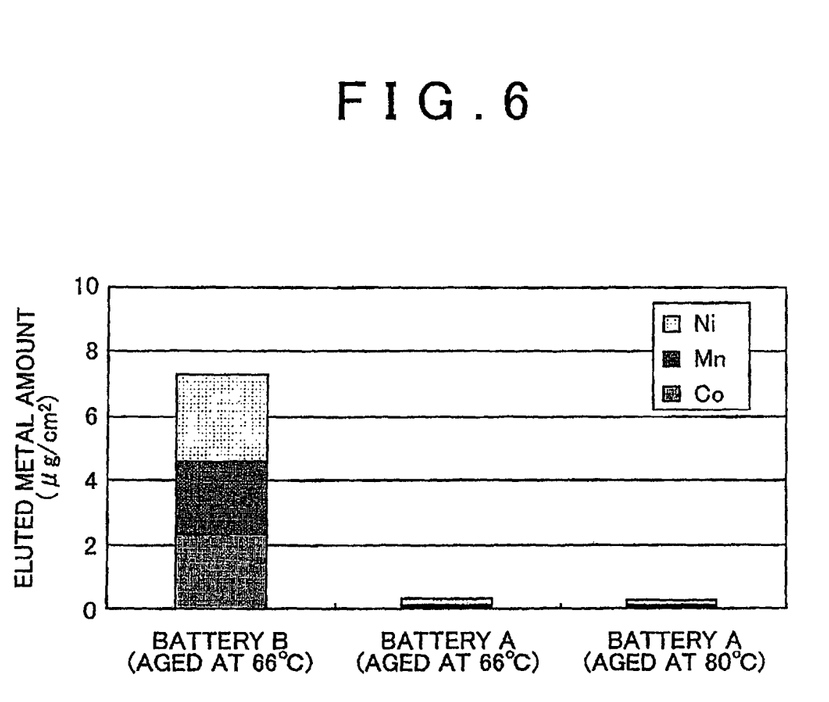
FIG. 6 is a graph comparing the elution amounts of metal elements at the starting end portions of wound electrode bodies.

As shown in Table 1 and FIG. 6, the lithium-ion secondary battery A is lower in eluted metal amount than the lithium-ion secondary battery B. A new battery having the same configuration as the lithium-ion secondary battery A was built and was evaluated by increasing the setting temperature during high-temperature aging to 80° C. The results are shown in Table 1 and FIG. 6. As shown in Table 1 and FIG. 6, it can be noted that, in the lithium-ion secondary battery having the configuration disclosed herein, it is possible to significantly reduce the elution of metal elements from the positive electrode active material even when the battery is exposed to an extremely high temperature environment. These results indicate the technical meaning of the present invention.

With respect to the negative electrode and the separators opposite to the terminating end portion of the positive electrode, the eluted metal elements were quantified by ICP analysis in the same manner as mentioned above. The eluted metal amount thus measured exhibits a value lower than (e.g., equal to or lower than 1/5 of) the value measured in the starting end portion.

While the embodiments and examples of the present invention have been described in detail, these are merely illustrative. Different modifications and changes of the aforementioned specific examples are included in the present invention.

The invention claimed is:

1. A lithium-ion secondary battery, comprising:
a flat wound electrode body including an elongated positive electrode, an elongated negative electrode longer than the positive electrode, and a separator, the wound electrode body being wound in a longitudinal direction, and the positive electrode and the negative electrode being laminated with the separator interposed between the positive electrode and the negative electrode;
a nonaqueous electrolyte that is impregnated into the wound electrode body;
a box-shaped case containing the wound electrode body that is impregnated with the nonaqueous electrolyte; and
a surplus nonaqueous electrolyte that exists in a gap between the wound electrode body and the box-shaped case,
wherein the wound electrode body includes a starting-end-side negative electrode remainder portion provided in a winding-direction starting end portion of the wound electrode body, the winding-direction starting end portion existing at a winding center side, and the starting-end-side negative electrode remainder portion protruding toward the winding center side along a winding direction beyond the positive electrode,
the starting-end-side negative electrode remainder portion is positioned in a region where the surplus nonaqueous electrolyte exists, when the lithium-ion secondary battery is disposed in a predetermined posture, wherein
the wound electrode body includes two winding flat portions opposite to each other and two semicircular winding round portions existing between the two winding flat portions in the winding direction, wherein the gap exists between an exterior perimeter of the winding flat portions and an interior side surface of the boxed-shaped case,
one of the two winding round portions is positioned in a bottom of the box-shaped case when the lithium-ion secondary battery is disposed in the predetermined posture,
the winding-direction starting end portion of the wound electrode body includes a winding-direction starting end portion of the positive electrode, and
the winding-direction starting end portion of the positive electrode is positioned in the winding flat portions, and a liquid level of the surplus nonaqueous electrolyte is positioned in the gap between the exterior perimeter of the winding flat portions and the interior side surface of the box shaped case, so that the winding-direction starting end portion of the positive electrode is positioned below the liquid level of the surplus nonaqueous electrolyte.

2. The battery according to claim 1, wherein
the wound electrode body includes a terminating-end-side negative electrode remainder portion provided in a winding-direction terminating end portion existing at a winding outer periphery side, the terminating-end-side negative electrode remainder portion protruding toward the winding outer periphery side along the winding direction beyond the positive electrode, and
the terminating-end-side negative electrode remainder portion is positioned in the region where the surplus nonaqueous electrolyte exists.

3. The battery according to claim 1, wherein
the starting-end-side negative electrode remainder portion is positioned in one of the winding flat portions.

4. The battery according to claim 1, further comprising:
a current interrupt device configured to operate when an internal pressure of the box-shaped case rises; and
a gas generating agent decomposed to generate a gas when the battery is overcharged.

5. The battery according to claim 1, wherein
the winding-direction starting end portion of the wound electrode body includes a winding-direction starting end portion of the positive electrode, and
a tip of the winding-direction starting end portion of the positive electrode is oriented vertically downward when the lithium-ion secondary battery is disposed in the predetermined posture.

6. The battery according to claim 1, wherein
a tip of the winding-direction starting end portion of the positive electrode is oriented vertically downward when the lithium-ion secondary battery is disposed in the predetermined posture.

\* \* \* \* \*